(12) United States Patent
Tedeschi et al.

(10) Patent No.: US 10,847,059 B2
(45) Date of Patent: Nov. 24, 2020

(54) DOCKING ARRANGEMENT FOR MANIKIN

(71) Applicant: Laerdal Medical AS, Stavanger (NO)

(72) Inventors: Ben Tedeschi, Lorena, TX (US); Paul Griffith, Gatesville, TX (US); David Thane, McGregor, TX (US); Giorgio Policante, Campiglia Cervo (IT)

(73) Assignee: Laerdal Medical AS, Stavanger (NO)

( * ) Notice: Subject to any disclaimer, the term of this patent is extended or adjusted under 35 U.S.C. 154(b) by 242 days.

(21) Appl. No.: 15/836,236

(22) Filed: Dec. 8, 2017

(65) Prior Publication Data

US 2019/0180648 A1 Jun. 13, 2019

(51) Int. Cl.
| | |
|---|---|
| *G09B 23/34* | (2006.01) |
| *A47F 8/00* | (2006.01) |
| *G09B 23/30* | (2006.01) |
| *G09B 23/28* | (2006.01) |
| *G09B 23/32* | (2006.01) |
| *A63H 3/46* | (2006.01) |

(52) U.S. Cl.
CPC ............ *G09B 23/34* (2013.01); *A47F 8/00* (2013.01); *G09B 23/28* (2013.01); *G09B 23/30* (2013.01); *G09B 23/32* (2013.01); *A63H 3/46* (2013.01); *G09B 23/303* (2013.01)

(58) Field of Classification Search
CPC ...................................................... G09B 23/24
USPC ........................................................ 434/267
See application file for complete search history.

(56) References Cited

U.S. PATENT DOCUMENTS

2004/0200864 A1 10/2004 Varner et al.
2016/0022058 A1 1/2016 Atkinson et al.

FOREIGN PATENT DOCUMENTS

GB 2292825 A 3/1996
WO WO-2009088303 A1 7/2009

*Primary Examiner* — Kesha Frisby
(74) *Attorney, Agent, or Firm* — Shackelford, Bowen, McKinley & Norton, LLP

(57) ABSTRACT

A limb and torso docking arrangement for a manikin comprising —a first connecting part for connection with a limb (30) of the manikin —a second connecting part for connection with a torso (not shown) of the manikin. The invention is distinctive in that the first connecting part includes a pin and a guide element protruding from the first connector part and a first plug part for electrical, and/or pneumatic transmission and/or liquid between the limb and the torso, the second connecting part includes an opening and a groove adapted to respectively receive the pin and the guide element of the first connecting part, the second connecting part further comprises a second plug part, the first plug part and second part being positioned on the respective first connecting part and the second connecting part so that the plug parts is adapted to mate when the first connecting part and second connecting part being connected, the thigh and pelvis docking arrangement further comprises a locking arrangement adapted to lock the first connecting part and the second connecting part together after being connected.

11 Claims, 6 Drawing Sheets

DOCKING ARRANGEMENT FOR MANIKIN

BACKGROUND

Technical Field

The invention relates to a docking arrangement between a limb and torso of a manikin. The invention relates in particular to a nursing skills training manikin having removable limbs, and especially to the connection between the pelvis and thigh of the manikin. The docking arrangement is however also applicable to other parts of the manikin, such as the shoulder connection.

History of Related Art

The present invention belong to the field of medical teaching models or manikin aimed for medical training.

A primary object of the present invention is to provide a manikin with removable limbs that will overcome the shortcomings of the prior art devices.

An object of the invention is to provide a nursing skills training manikin with removable limbs in which portions of each limbs can be disassembled at the major joints to make the manikin easier to store and transport.

Another object is to provide a manikin with removable limbs that is simple and easy to use without the use of tools.

A further object of the invention is to provide a secure connection between the pelvis and the thigh of the manikin.

It is yet a further object of the invention to provide a connection that has the same movement as a human thigh.

It is also an object of the invention to provide a connection to transfer various signals from the pelvis to the thigh for various operation, such as electrical pneumatic and possibly liquid.

It is a further object of the invention to provide a secure connection between other parts of the manikin, such as the shoulder Further objects of the invention will appear as the description proceeds.

SUMMARY

The invention relates to a limb and torso connecting arrangement for a manikin comprising a first connecting part for connection with a limb of the manikin a second connecting part for connection with a torso of the manikin, The first connecting part comprises a pin and a guide element protruding from the first connector part and a first plug part for electrical and/or pneumatic transmission between the limb and torso, the second connecting part comprises an opening and a groove adapted to respectively receive the pin and the guide element of the first connecting part, and a second plug part, the first plug part and second part being positioned on the respective first connecting part and the second connecting part so that the plug parts is adapted to mate when the first connecting part and second connecting part being connected, the docking arrangement further comprises a locking arrangement adapted to lock the first connecting part and the second connecting part together after being connected.

In a preferred embodiment, the locking arrangement comprising a first locking part arranged on the first connecting part and a second locking part rotatably attached to a stationary part of the second connecting part.

In yet another preferred embodiment, the second locking part further comprising a handle and a part having a slot, the first locking part being formed as a recession in the pin, the slot and recession being arranged so that the slot slide in the recession when the second locking part is rotated towards a locking position where the first connecting part and second connecting part are locked together.

In another preferred embodiment, the first connecting part comprising at least two guide elements, the second connecting parts comprising at least two corresponding groves, the guide elements and the grooves are adapted to mate when the first connecting part and the second connecting part being connected.

In another preferred embodiment, the docking further comprising a link forming pivotable connection between the limb and the first connecting part.

In another preferred embodiment, the link comprising a first pivotable connection between the limb and the link and a second pivotable connection between the link and the first connecting part.

In a further preferred embodiment, the thigh is pivotable about a first axis arranged in a plane extending through the first and second pivotable connections, the first connection is pivotable about and second axis arranged in the plane extending through the first and second pivotable connections.

In another preferred embodiment of the invention, the docking further comprising a further locking mechanism, the further locking mechanism having a guide rail arranged on the rotatable locking part of the connecting mechanism and a receiver adapted to receive the guide rail when the second locking part is moved to the locking position.

In another preferred embodiment the pin protruding along and a centre axis of the first connecting part, the centre axis being perpendicular to the plane extending through the first and second pivotable connections on the link.

In yet a further preferred embodiment of the invention the second connection part being fixedly attached to the torso or forming an integrated part of the torso.

In a further preferred embodiment, the docking arrangement is a connection between the thigh and pelvis of a manikin.

The invention also relates to a limb and torso docking arrangement for a manikin comprising—a first connecting part for connection with a limb of the manikin, a second connecting part for connection with a torso (not shown) of the manikin, the first connecting part comprises a pin and a guide element protruding from the first connector part, the first connecting part further comprises a link forming a pivotable coupling between the limb and the torso (not shown), the second connecting part comprises an opening and a groove adapted to respectively receive the pin and the guide element of the first connecting part, the thigh and pelvis docking arrangement further comprises a locking arrangement adapted to lock the first connecting part and the second connecting part together after being connected.

BRIEF DESCRIPTION OF DRAWINGS

The invention will now be described in detail with reference to the accompanying drawings, in which.

DETAILED DESCRIPTION

In general, it will be understood that terms such as horizontally and vertically must be interpreted in the broadest sense and are defined in view of the orientation of the parts in the appended drawings. The parts could also have other arrangements than disclosed in the figures and defined in the description when the invention is in use.

Figure 1:
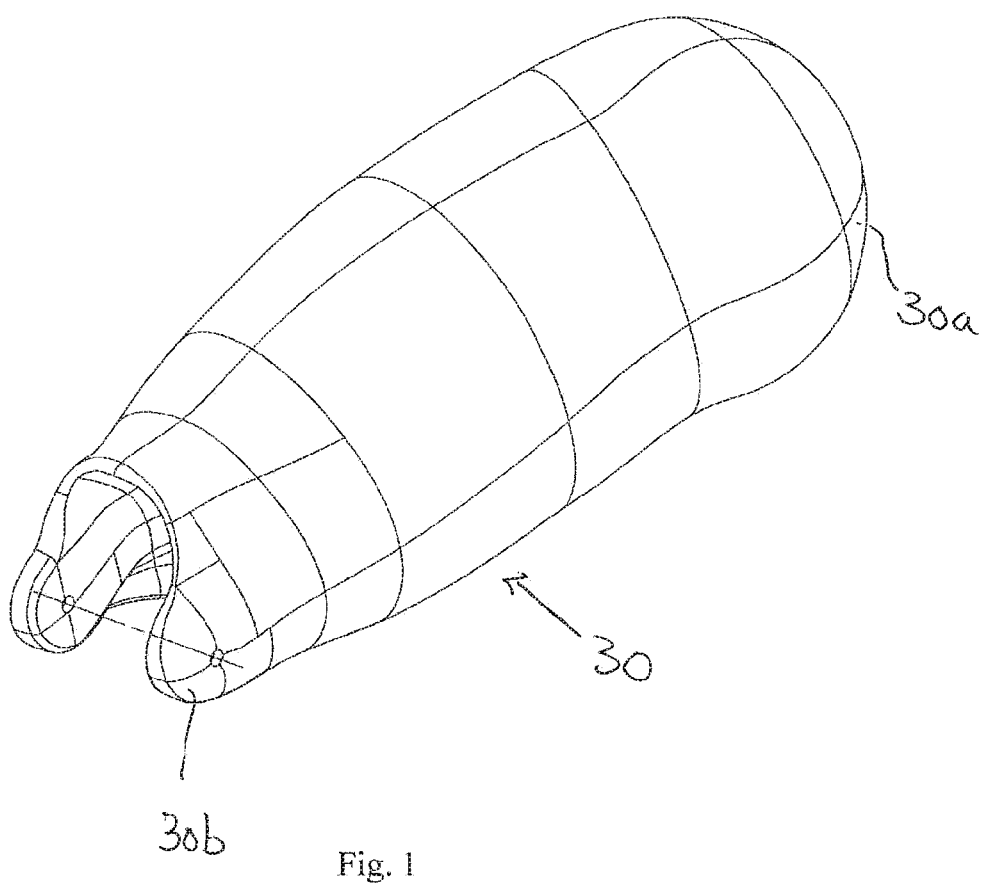
FIG. 1 shows an outer structure of a thigh covering the first connecting part of the invention.

FIG. 1 shows an outer structure of a thigh 30 covering a first connecting part 1 of the invention. The outer structure 30 having a first end 30a where the first connecting part 1 is arranged. The first connecting part 1 is not shown in this figure. The first end 30a illustrates the top part of a thigh.

The outer structure further comprises a second end 30b illustrating a part of a knee-joint adapted to be connected to a lower leg.

Figure 2:
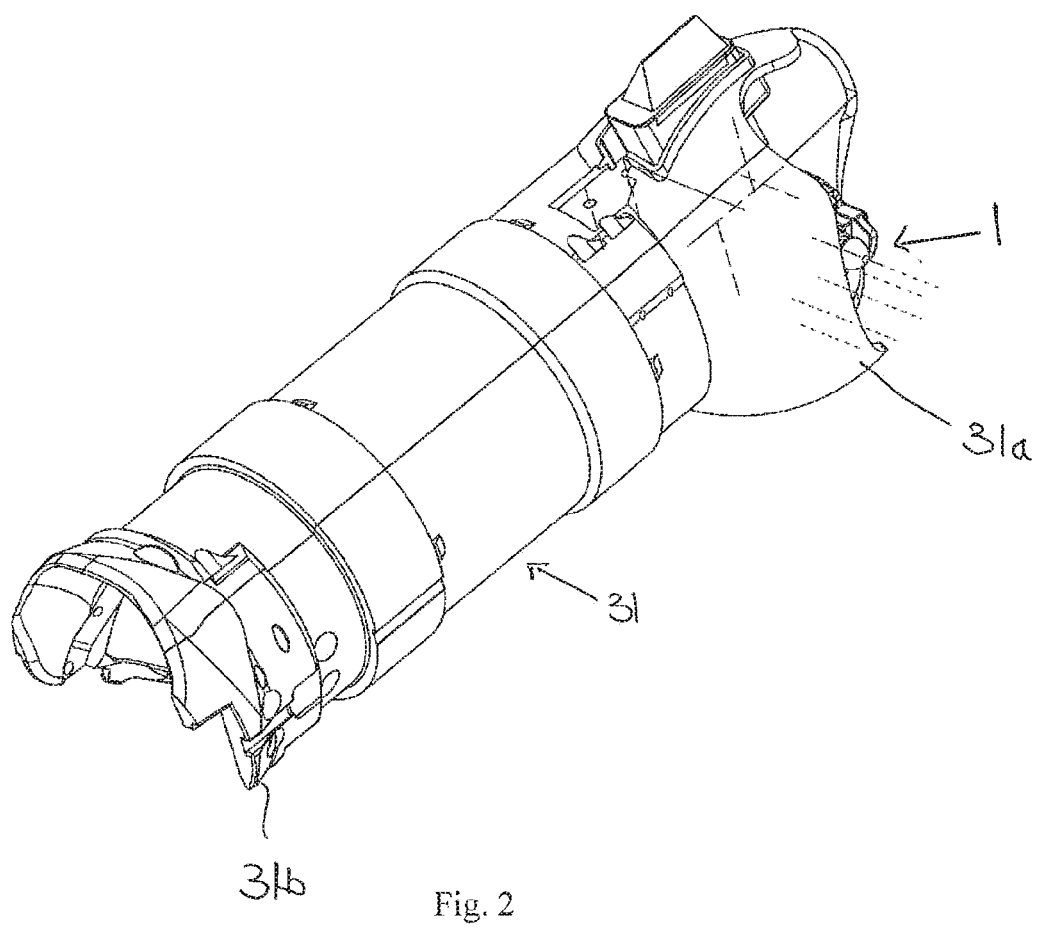
FIG. 2 shows a part of the thigh with the first connecting part according to the invention, viewed from the side.

FIG. 2 shows an inner structure of a thigh 31. The first connecting part 1 is attached at the inside of the inner structure 31. The inner structure 31 having a first end 31a at the top part of the thigh and a second end 31b at the knee-joint. The inner structure 31 having a shape corresponding with the outer structure 30. The first connecting part 1 is coupled to the inner structure at the first connecting end as indicated in the figure.

Figure 3:
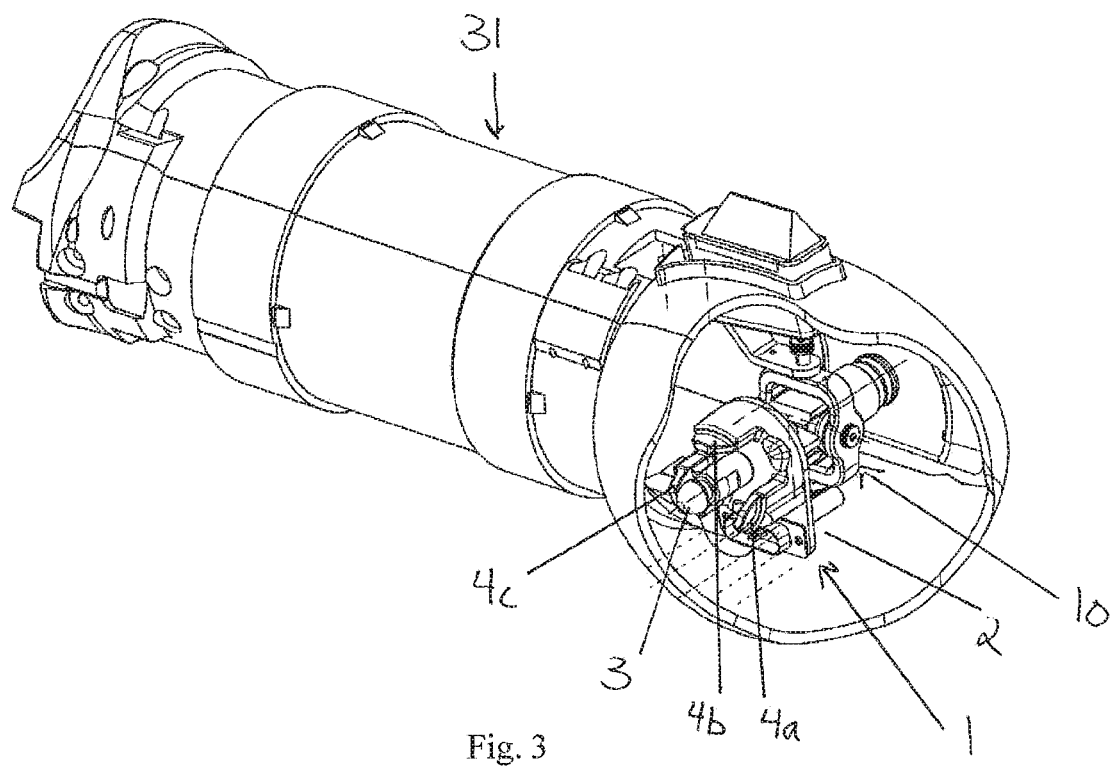
FIG. 3 shows the part of the thigh with the first connecting part according to the invention, viewed from the end with the first connecting part.

FIG. 3 shows the inner structure of the thigh 31 viewed from the opposite side than in FIG. 2. This figure discloses the position of first connecting part 1 at the inside of the thigh. The first connecting part 1 comprising connecting portion 2 and a link 3. The connection portion 2 is connected via a link 10 in the area of the first end 31a. The first connecting part 1 is arranged at distance from the first end 31a so that when the first connecting part is connected to a second connecting part of the pelvis, the thigh and pelvis obtain a normal structure for a manikin.

The connecting portion 2 is connected to the link 10 for movable connection between the connecting portion 2 and the thigh 31. This movable connection provide an imitation of the movement of a human thigh in relation to the pelvis.

The connection portion part 2 may be connected directly to the thigh, but this is a less preferable embodiment since without the link, the thigh won't articulate as designed.

Figure 4:
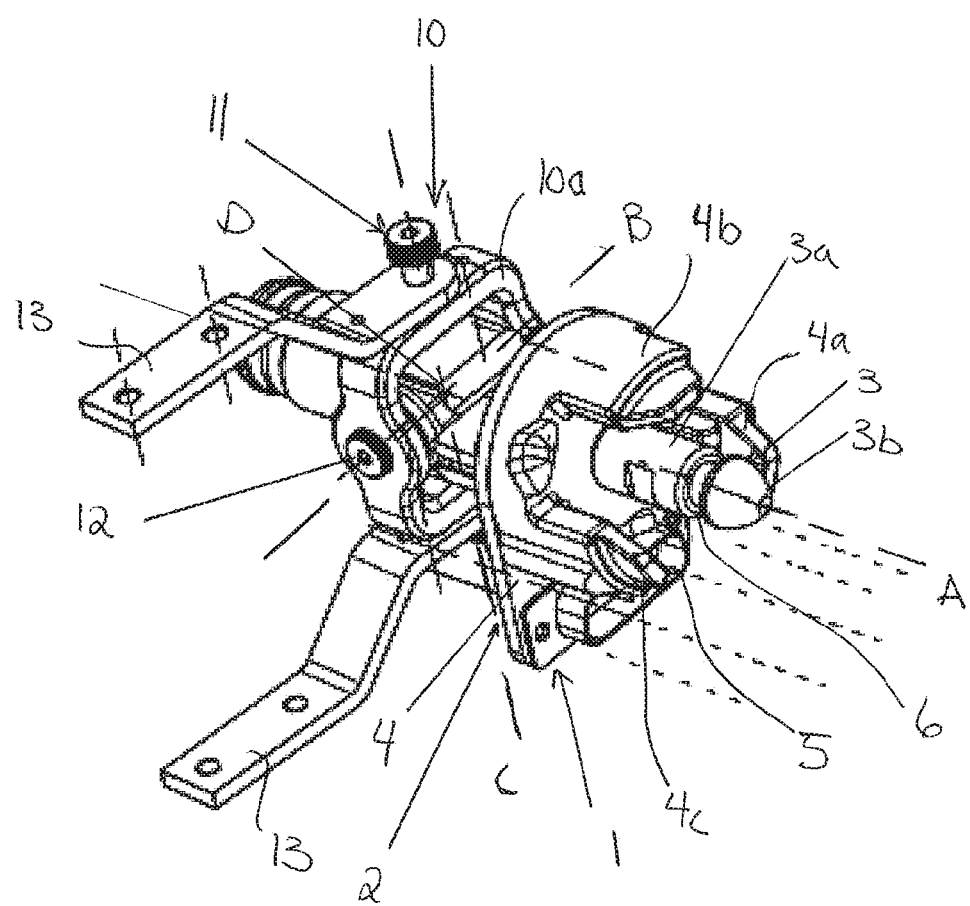
FIG. 4 shows a detailed view of the first connecting part according to the invention.

As shown in the embodiment of the FIGS. 3 and 4, there is arranged a pair of brackets 13 between the link 10 and the thigh 31, 30. The brackets 13 are in one end attached at the inside of the inner structure 31 and pivotable connected to the link 10 in the opposite ends. The brackets 13 are connected to the link 10 in two opposite arranged first pivotable connections 11.

The invention is however not limited to a connection with two brackets 13. Other connections are also possible, such as one bracket extending between one of the pivotable connections 11 and the thigh 31 or one common bracket extending from both first pivotable connections 11 and the inner structure 13.

Figure 6:
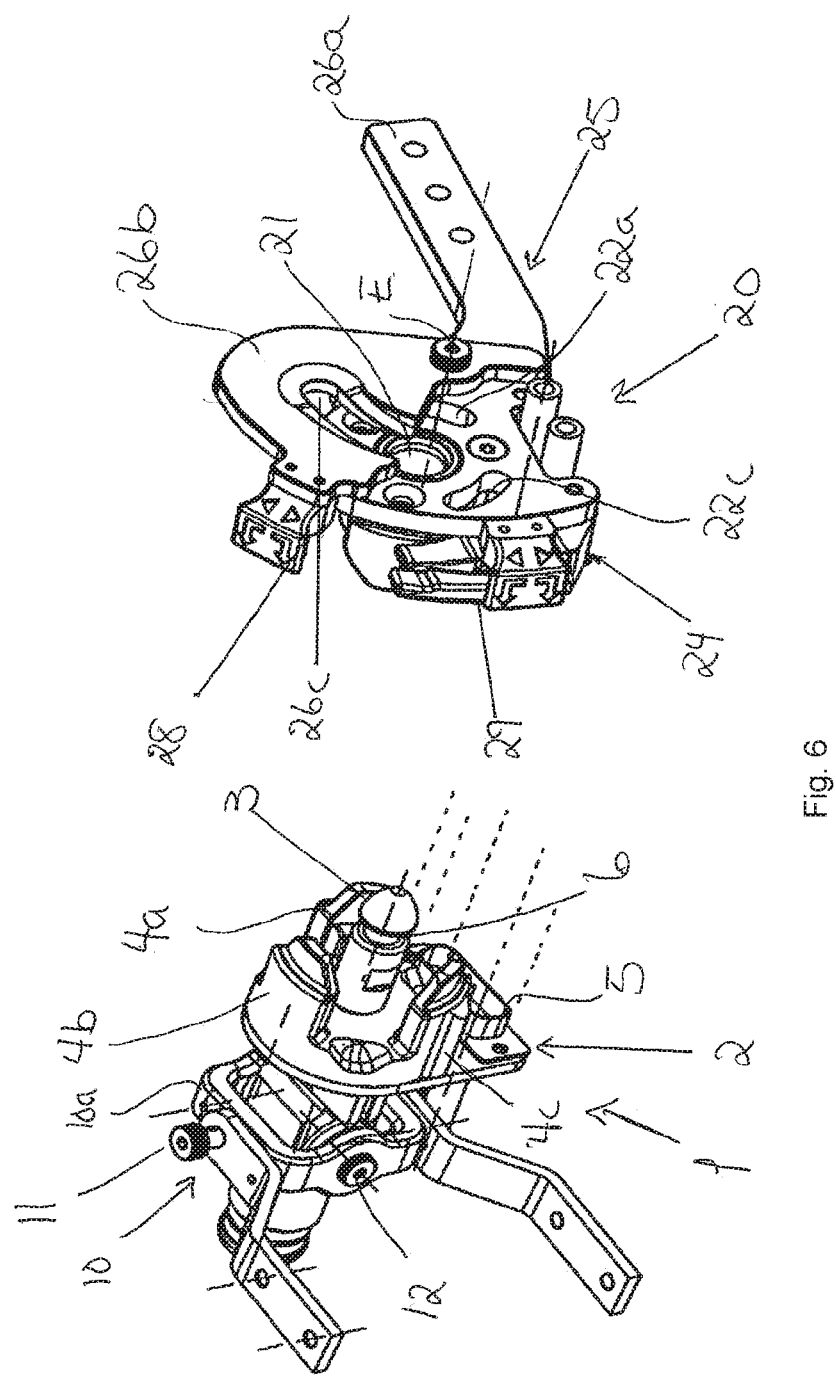
FIG. 6 shows the first and second connecting part, both oriented in a direction for connection to each other.

The functioning of both the first connecting part 1 and the link 10 will be further disclosed in relation to the FIGS. 4 and 6.

FIG. 4 shows a detailed view of the first connecting part 1 and the link 3 without the thigh 30, 31.

The connecting part 1 having a main part composed of a vertically arranged sheet 4 with guide element 4a, 4b, 4c. The guide elements 4a, 4b, 4c are equally disposed around a circle on the surface of the sheet 4. The guide elements 4a, 4b, 4c are protruding perpendicular from the surface of the sheet 4 so that they are arranged horizontally out from the sheet 4.

The figure shows an embodiment with three guide elements 4a, 4b, 4c. It is however possible to have one, two or more than three guide elements. These being alternative embodiments of the invention.

The first connecting part 1 further comprises a pin 3 protruding from a center position of the sheet 4 in the same direction as the guide elements 4a, 4b, 4c. The pin 3 and the guide elements 4a, 4b, 4c are thus arranged parallel to each other as illustrated in the FIG. 4. The pin 3 is however longer than each of the guide elements 4a, 4b, 4c.

The pin 3 having a circumferential recession 6. This recession 6 being preferably arranged near a free end 3b of the pin 3 or at an upper ¼ from the free end 3b. The recession 6 being defined as a part of the pin 3 having less diameter that a main section 3a of the pin 3. The free end 3b of the pin 3 could also have a curved shape to easier facilitate the mating with the second connecting part 2 as illustrated in the figure.

The first connecting part 1 further comprising a first plug part 5. The first plug part 5 is a plug for electrical and/or pneumatic transmission or other signals between the parts of the manikin (not shown).

In the figures, the first plug part 5 is arranged below the guide elements 4a, 4b, 4c and the pin 3. Other positions are possible, the first plug part 5 must however be arranged at the same side as the guide elements 4a, 4b, 4c and the pin 3 and in a position corresponding with a second plug part 5 arranged on the second connecting part 2.

The FIG. 4 further comprising the link 10. As described above, the link 10 has a first pivotable coupling 11 to the thigh 30 or inner structure of the thigh 31. The link 10 is further pivotable connected to the first connecting part 1 in a second pivotable connection 12.

As shown in the figure, the link 10 may be formed as a frame 10a formed as a rectangle. The first pivotable connections 11 are arranged at two opposite sides of the rectangle. The second pivotable connections 12 being arranged on the remaining two opposite sides of the rectangle.

The first connecting part 1 being in the embodiment shown, arranged in the hollow space inside the rectangle. The first connecting part 1 being connected to the rectangle at each side of the portion situated in the rectangle or through other suitable ways to connect the link 10 and the first connecting part in a pivotable connection.

An axis B is extending through the second pivotable connections 12 in a plane extending through all of the pivotable connections 11, 12.

An axis C is extending through the first pivotable connections 11 in the same plane as axis B. The axis B and C being arranged perpendicularly to each other in this plane.

With reference to FIG. 3, the pivotable connections 11, 12 results in a pivotable movement of the thigh 30, 31 in two perpendicular directions, both about the axis B and about the axis C. It is thus possible to move the thigh in a rolling motion when connected to the manikin.

A center axis A is further extending through the longitudinal center of the pin 3 of the first connecting part 1. The axis A is intersecting axis B and axis C in a point D arranged in the plane of axis B and C. This point D is congruent with the center of the link 10.

Figure 5:
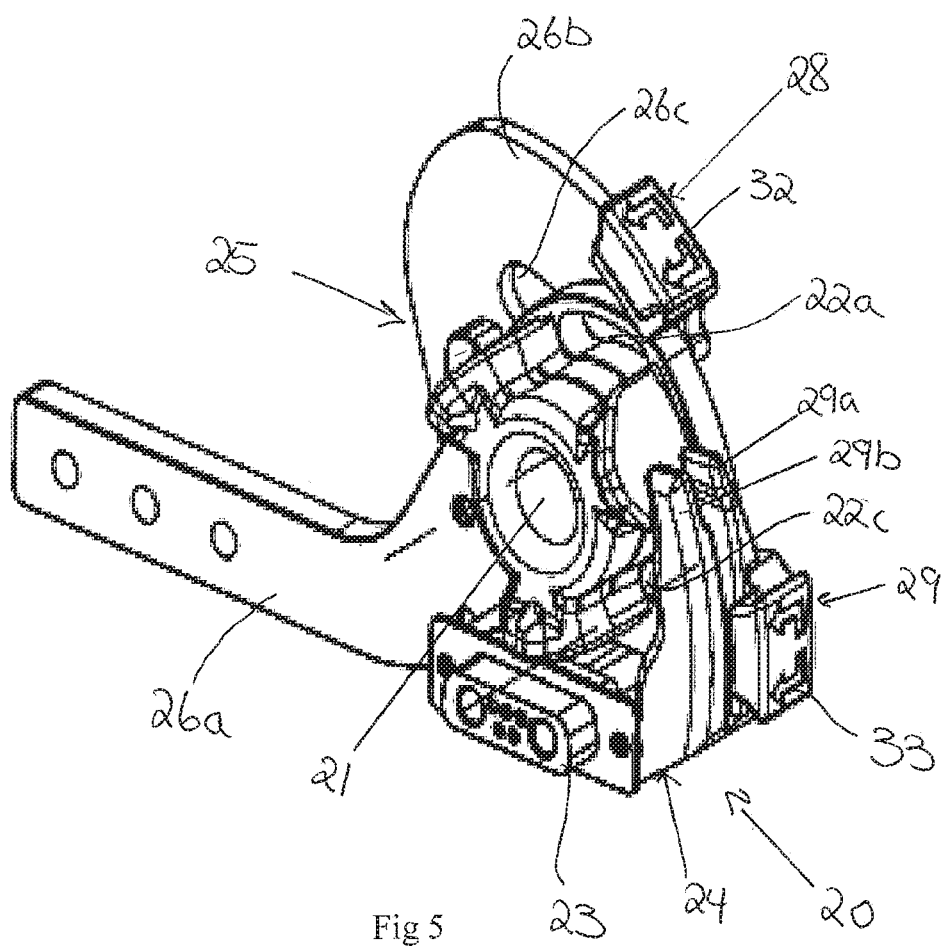
FIG. 5 shows a detailed view of the second connecting part for attachment to the pelvis according to the invention, viewed from the side.

FIG. 5 shows the second connecting part 20 in further detail, viewed from the side adapted to connect to the first connecting part 1. This second connecting part 20 is attached to the pelvis of the manikin.

The second connecting part 20 comprising a stationary part 24 and a locking part 25, the locking part 25 is rotatable connected to the stationary part 24 in a point E (see FIG. 6). The locking part 25 is thus adapted to rotate partly around an axis situated perpendicular to the surface of the locking part 25 and extending through the point E.

The stationary part 24 comprises an opening 21 extending through the center of the stationary part 24. The stationary part 24 further comprises grooves 22a, 22b, 22c surrounding the opening 21 in a circumferential ring around the opening 21 and in a distance from the opening 21. The figure shows an embodiment with three grooves 22a, 22b, 22c. It is however possible to have a different number of grooves, for instance one, two or more than three. It is however important that the number of grooves 22a, 22b, 22c corresponds with the number of guide elements 4a, 4b, 4c on the first connecting part 1. The opening 21 and grooves 22a, 22b, 22c are positioned on second connecting part 20 so that they are adapted to correspond with the pin 3 and guide elements 4a, 4b, 4c on the first connecting part 1.

The stationary part 24 further having a second plug part 23 positioned so that the second plug part is adapted to mate with the first plug part 5 on the first connecting part 1, as shown in the figure.

The locking part 25 of the second connecting part 2 comprises a handle 26c and a securing plate 26b having a slot integrated in the securing plate 26c. The handle 26a and securing plate 26b are fixedly connected or integrated so that both parts are rotating together around the axis through the connection point E.

A thickness of the securing plate in the area surrounding the slot 26c could be slightly reduced as indicated in the figures. This facilitates the engagement of the slot 26c in the recess 8 as will be described further below. The thickness of the recess 8 could also be thinner as a result of this.

The second connecting part 20 comprises a further locking mechanism 28, 29. The further locking mechanism 28, 29 comprising a guide rail 28 attached to the movable locking part 25. More specifically, the guide rail 28 is attached to distal end of the securing part 26b.

The further locking mechanism 28, 29 comprising a receiver 29 attached to the stationary part 24 of the second connecting part 20. The receiver 29 is shaped as a fork with two upwardly oriented parts 29a, 29b adapted to receive the guide rail 28 between the parts 29a, 29b. The further locking mechanism could also have blocks 32, 33 attached to the respective stationary part 24 and locking part 25. The blocks 32, 33 are arranged in connection with the guide rail 28 and the receiver 33 for preventing further movement of the locking part 25 when the locking part have reached a suitable locking position as will be described further below.

FIG. 6 shows both the first connecting part 1 and the second connecting part 20. The first connecting part 1 and second connecting part 20 are both oriented in a position so that the sides of the connecting parts 1, 20 adapted to be connected, are facing each other.

The functioning of the invention will now be described in two operations: an engaging operation of the first and second connecting parts 1, 20 and a locking operation of the first and second connecting parts 1, 20.

In the engaging operation, the pin 3, guide elements 4a, 4b, 4c and first plug part 5 will mate respectively with the opening 21, the grooves 22a, 22b, 22c and the second plug part 23. When the first and second connecting part 1, 20 are engaging each other, the pin 3 is protruding out from the opening 21 so that the recess 6 is protruding out from the opening 21. The guide pin 4a, 4b, 4c will however not protrude out of the from the respective grooves 22a, 22b, 22c.

The locking operation could be performed after the engaging operation.

When the first and second connecting part are engaging, the locking mechanism 26 is rotated around connecting point E. The slot 26c of the securing plate 26b is mating with the recess 6 and further sliding in the recess 6 until the pin 3 meets the endpoint of the slot 26c.

For a further secure locking of the first and second connecting part 1, 20 the guide rail 28 attached to the securing plate 26b is engaging with the receiver 29 attached to the stationary part 24 of the second connecting part 20. The guide rail 28 is further moved longitudinally in the receiver 29. When the two corresponding stopping blocks 32, 33 meets, the locking mechanism has reached the locked position.

Even though the description discloses that the first connecting part 1 and link 10 are connected to the thigh and the second connecting part 20 is connected to the pelvis, it is possible to switch the connecting parts 1, 20 so that the second connecting part 20 is connected to the thigh 31 and the first connecting part 1 is connected to the pelvis.

The principle of the connection arrangement or docking could also be used to connect other part of the manikin such as the arm to the shoulder.

The present invention has been described with reference to preferred embodiments and aspect thereof and related to the accompanying drawings for the sake of understanding only and it should be obvious to persons skilled in the art that the present invention includes all legitimate modifications within the ambit of what has been described hereinbefore and claimed in the attached claims.

What is claimed is:

1. A limb and torso docking arrangement for a nursing skills training manikin, the limb and torso docking arrangement comprising:
    a first connecting part for connection with a limb or a torso part of the manikin;
    a second connecting part for connection with the other of the limb or the torso part of the manikin;
    wherein the first connecting part comprises a pin and a guide element protruding from the first connecting part and a first plug part that connects the limb and the torso part;
    wherein the second connecting part comprises an opening and a groove adapted to respectively receive the pin and the guide element of the first connecting part, the second connecting part further comprising a second plug part, the first plug part and second plug part being positioned respectively on the first connecting part and the second connecting part so that the first and second plug parts are adapted to mate when the first connecting part and the second connecting part are connected, wherein said first and second plug parts are adapted to transmit at least one of electrical, pneumatic or fluid transmission between the limb and torso part;
a locking arrangement adapted to lock the first connecting part and the second connecting part together after being connected; and
a first locking part arranged on the first connecting part and a second locking part rotatably attached to a stationary part of the second connecting part, the second locking part being adapted to rotate towards and engage the first locking part for locking the first and second connecting parts together in a locked position.

2. The limb and torso docking arrangement according to claim 1, the second locking part further comprising a handle and a securing part having a slot, the first locking part being formed as a recession in the pin, the slot and the recession being arranged so that the slot is adapted to slidingly engage with the recession when the second locking part rotates towards a locking position so that the first connecting part and the second connecting part are connected together.

3. The limb and torso docking arrangement according to claim 1, the first connecting part comprising at least two guide elements, the second connecting part comprising at least two corresponding grooves, wherein the guide elements and the grooves are adapted to mate when the first connecting part and the second connecting part are connected.

4. The limb and torso docking arrangement according to claim 1, wherein the first connecting part further comprises a link and a connection portion, the link forming a pivotable coupling between the limb and the connection portion.

5. The limb and torso docking arrangement according to claim 4, the link comprising a first pivotable connection between the limb and the link and a second pivotable connection between the link and the connecting portion of the first connecting part.

6. The limb and torso docking arrangement according to claim 5, wherein the limb is pivotable about a first axis arranged in a plane extending through the first and second pivotable connections, the limb is pivotable about a second axis arranged in the plane extending through the first and second pivotable connections, and the first axis and second axis are arranged perpendicularly in the plane.

7. The limb and torso docking arrangement according to claim 5, the pin protruding along a centre axis of the first connecting part, the centre axis being perpendicular to a plane extending through the first and second pivotable connections of the link.

8. The limb and torso docking arrangement according to claim 1, comprising a further locking mechanism, the further locking mechanism having a guide rail arranged on a securing part of the second connecting part and a receiver arranged on a stationary part, the receiver being adapted to receive the guide rail when the locking part is moved to a locking position.

9. The limb and torso docking arrangement according to claim 1, the first connecting part being connected to a thigh of the manikin.

10. The limb and torso docking arrangement according to claim 1, the second connection part being fixedly attached to a pelvis or forming an integrated part of a pelvis.

11. A limb and torso docking arrangement for a nursing skills training manikin, the limb and torso docking arrangement comprising;
a first connecting part for connection with a limb of the manikin;
a second connecting part for connection with a torso of the manikin;
wherein the first connecting part comprises a pin and a guide element protruding from the first connecting part, the first connecting part further comprising a link forming a pivotable coupling between the limb and the torso;
the link comprising a first pivotable coupling between the limb and the link and a second pivotable coupling between the link and the first connecting part;
wherein the second connecting part comprises an opening and a groove adapted to respectively receive the pin and the guide element of the first connecting part; and
a locking arrangement adapted to lock the first connecting part and the second connecting part together after being connected.

* * * * *